J. J. BAUSCH.
Microscope.

No. 199,015. Patented Jan. 8, 1878.

Witnesses:

Inventor:
John J. Bausch

UNITED STATES PATENT OFFICE.

JOHN J. BAUSCH, OF ROCHESTER, ASSIGNOR TO THE BAUSCH & LOMB OPTICAL COMPANY, OF SAME PLACE, AND THE ORANGE JUDD COMPANY, OF NEW YORK, N. Y.

IMPROVEMENT IN MICROSCOPES.

Specification forming part of Letters Patent No. 199,015, dated January 8, 1878; application filed December 17, 1877.

*To all whom it may concern:*

Be it known that I, JOHN J. BAUSCH, of Rochester, in the county of Monroe and State of New York, have invented a new and Improved Microscope; and that the following is a full, clear, and exact description of the same, reference being had to the accompanying drawings, and to the letters of reference marked thereon, making part of this specification.

This invention is in the nature of an improvement in microscopes; and the invention consists in a microscope with a convex base, with a slot therein for the admission of light beneath the stage, the base having fixed to it clips to retain the slide in position, and also a standard, whereon are placed adjustable lenses.

Figure 1:
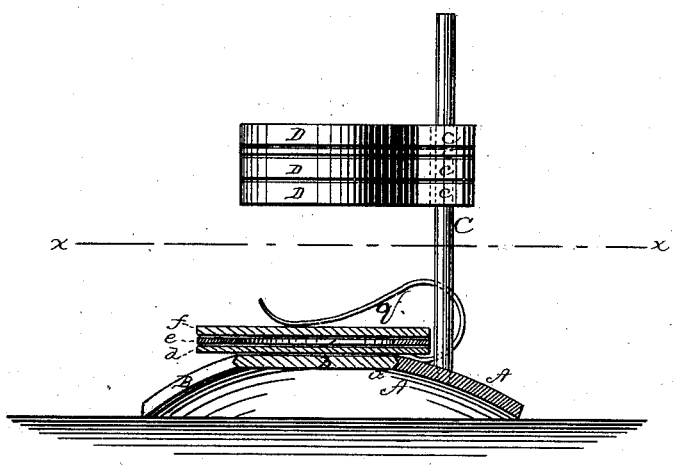
Figure 2:
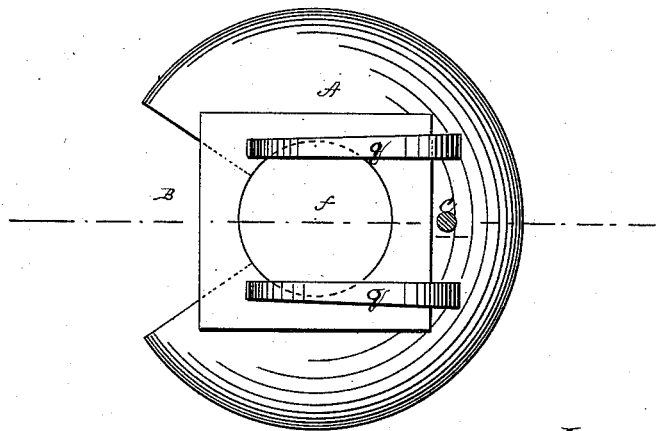

In the accompanying sheet of drawings, Figure 1 is a side view of my microscope, partly in section; and Fig. 2, a horizontal section of same in line *x x*, Fig. 1.

Similar letters of reference indicate like parts in both figures.

The microscope to which this invention more particularly applies is a pocket-microscope, to be used, either in the hand or on a table, with transmitted or reflected light. The base A of my microscope is made of vulcanite or other suitable material, and is of convex form, constructed with a slot or opening, B, in its side, and a circular opening, *a*, in its center, the slot B opening into the central opening *a*. Into this central opening is fitted a glass stage, *b*. To the base A are also fixed spring-clips *q q*, which extend across the top of the base, with the stage *b* between them, as shown in Fig. 2. There is also fitted to the base A a vertical standard, C, which standard supports one or more lenses, D, by passing through a lug, *c*, on the frames of the lenses, in such a manner as will permit the lenses to slide and be adjusted vertically to the proper focal distance from the stage or object placed thereon for inspection. Besides the stage *b*, the microscope is provided with a glass slide, *d*, and diaphragm *e* and cover *f*, for supporting and retaining objects.

My invention, constructed as above described, is operated by placing an object on the stage *b*, and by sliding the lenses D on the standard C until a clearly-defined view of the object on the stage is obtained. The magnifying-power used may be varied by using one or more of the lenses D at a time. If the object is opaque, nothing further is required, but, if the object is transparent, and to be viewed by means of transmitted light, then the instrument (while held in the hand or placed on a table) is turned so as to bring the slot or opening B toward the light, as from a window, when the light will be transmitted through the stage *b*, and through the object placed thereon. This effect will be heightened by placing the instrument on a sheet of white paper, to reflect the light after it has entered the opening B.

When it is desired to observe a live insect, or an object that would be disturbed by the air or the breath of the observer, or a fluid that would quickly evaporate if exposed to the air, the glass slide *d* is placed on the stage *b*. A water-proof diaphragm, *e*, with a circular opening, *i*, therein, is placed on the slide. The object to be viewed is then placed on the slide, and within the opening *i*. A glass cover, *f*, then being placed on the diaphragm *e*, the object is imprisoned in the cell, which is now formed by the slide *d*, diaphragm *e*, and cover *f*, so that it cannot escape, the several parts forming the cell being held in position by the spring-clips *q q*, beneath which they are placed. These clips may also be used for holding objects when the cell is not in use.

Having now described my invention, what I claim as new, and desire to secure by Letters Patent, is—

A microscope with a convex base, having a glass stage fixed within a central opening therein, and with an opening in its side for the admission of light beneath the stage, substantially as and for the purposes described.

In testimony whereof I hereunto set my hand.

JOHN J. BAUSCH.

Witnesses:
JOSEPH E. LUDLAM,
WM. GRAEBE.